Nov. 4, 1958            H. MUNN            2,859,048
VEHICLE SAFETY EQUIPMENT FOR PASSENGER PROTECTION
Filed Oct. 7, 1955
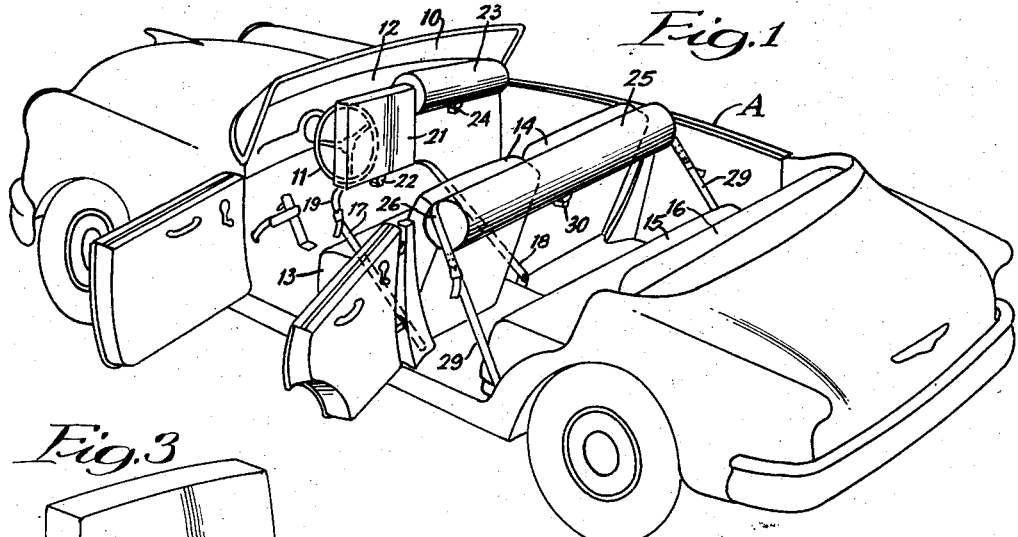
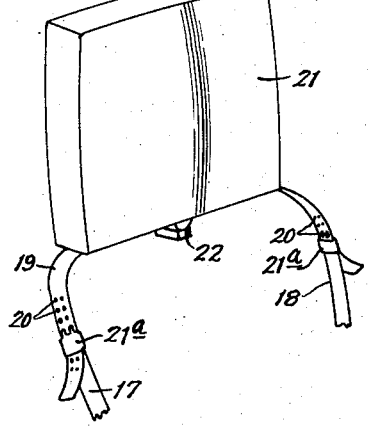
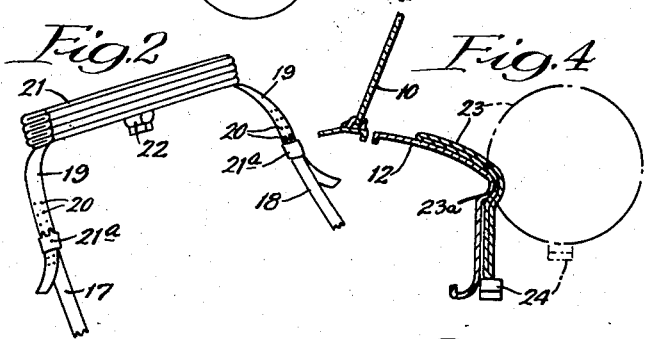
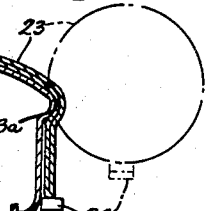
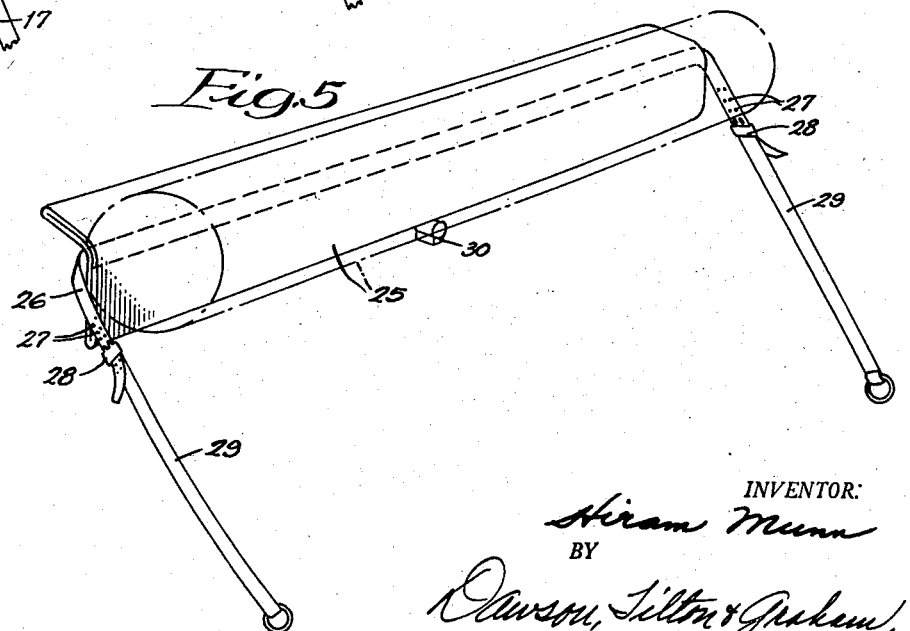
INVENTOR:
Hiram Munn
BY
Dawson, Tilton & Graham
ATTORNEYS.

United States Patent Office 2,859,048
Patented Nov. 4, 1958

2,859,048

VEHICLE SAFETY EQUIPMENT FOR PASSENGER PROTECTION

Hiram Munn, Ames, Iowa

Application October 7, 1955, Serial No. 539,069

10 Claims. (Cl. 280—150)

This invention relates to vehicle safety equipment and is particularly useful in preventing injuries to occupants of automobiles, and the like.

An object of the present invention is to provide means for protecting the driver and other occupants of a vehicle such as an automobile against injury from contact with the steering wheel, windshield, dashboard, etc. A further object is to provide means for preventing the occupants of a car from being thrown from the car in the case of a collision or similar accident. A still further object is to employ, in combination with straps, means for directing the occupants toward a cushioned member associated with the straps, whereby the force of the momentum of the passengers is carried by the cushioning member and whereby the passengers are further protected from contact with the windshield, etc. Yet a further object is to provide cushioning in an automobile wherein straps are employed in combination with inflated cushioning means to direct the weight of the persons away from the straps and toward the cushioning elements, while at the same time utilizing the cushioning elements to form barriers for preventing contact between the passengers and the windshield, etc. Still another object is to provide in such structures transparent cushioning members which do not substantially interfere with the vision of the car occupants, while at the same time providing inflated members which, upon impact with the occupants of the car, tend to roll upwardly into a protected position adjacent the windshield of the car. A still further object is to provide inflatable cushions with means for bringing about such inflation in the event of sudden heavy deceleration of the car or in the case of sudden stoppage of the car, etc. Other specific objects and advantages will appear as the specification proceeds.

The invention is shown, in an illustrative embodiment, by the accompanying drawing, in which—

Figure 1 is a perspective view of an automobile equipped with safety devices embodying my invention; Fig. 2, a perspective view of a steering wheel protective device shown in unexpanded position; Fig. 3, a view similar to Fig. 2 but showing the structure inflated; Fig. 4, a detail sectional view of a portion of the dash equipped with an inflatable member adapted to be inflated to provide a protective cushion over the dash and adjacent the windshield; and Fig. 5, a perspective view of a strap-equipped inflated member for the protection of back seat occupants.

In the illustration given, A designates an automobile, which may be of any suitable type or structure. In the specific illustration given and for clearness of illustration, the automobile is of the open type, but it will be understood that a closed type of automobile may be employed. The automobile A is equipped with a windshield 10, a steering wheel 11, a dashboard 12, front seats 13 equipped with backs 14, and a rear seat 15, equipped with seat back 16.

Straps 17 and 18 extend about the driver's seat back 14, and are fastened at their rear to the floor frame of the car. Adjustably secured to the straps 17 and 18 is the pad strap 19, which is preferably provided with adjustment openings 20 for receiving latching buckles 21a. The strap 19 is secured to the base of the inflatable pad 21 which is shown in deflated condition in Fig. 2 and in inflated condition in Fig. 3. Secured to the bottom of the structure 21 is a pressure cartridge 22 normally containing gas under high pressure and controlled by a release valve which permits the gas to flow into the structure 21 upon sudden heavy deceleration of the car. The cartridge 22 is of well-known structure which has been employed for many years for the inflation of rafts and floats of various sorts, and the release of the gas to the chamber 21 may be effected through the breaking of a valve closure or the use of a pendulum or other inertia-operated device. Such structures are shown in Hetrick Patent 2,649,311 and in Scheible Patent 2,071,903. Since such structures are of well-known construction, a detailed description is believed herein unnecessary.

In Figs. 1 and 4, the dash 12 is shown provided with a deflated airtight container 23 similarly equipped with a pressure container 24 filled with gas and adapted, upon sudden deceleration of the car, to fill the container 23. The filled container 23 is shown in dotted lines in Fig. 4. The container 23 may normally be secured to the front portion of the dashboard by adhesive as represented by numeral 23a, and is preferably in the position shown in Fig. 4 so that under impact, the inflated cushion 23 tends to roll upwardly so as to provide a protective barrier which will prevent the front seat occupant from contact with the windshield 10.

I prefer to employ transparent material in the forming of the cushioning inflatable members 21 and 23, and for this purpose I have found various plastic structures which, while being sufficiently transparent so as not to interfere with vision, at the same time provide the necessary strength. Suitable materials are chlorinated rubber, ethylene-glycolterephthalate, polyethylene, polyethylene combined with vinylidene chloride, and a variety of other plastics and thermoplastic film, etc. Nontransparent flexible structures such as rubber, plasticized fabric, etc., may also be employed.

I prefer also to suspend upon the rear of the front seat back 14 an elongated inflated cushion member 25, which is preferably secured to a strap 26 having perforated adjustment ends 27 engageable by means of buckles 28 with straps 29 adapted to be secured to the car frame through any suitable connections. The member 25 may be equipped with an inflation cartridge 30, or, if desired, may be kept constantly in inflated condition since it occupies a relatively non-obstructing position at the rear of seat backs 14. The buckles 28 may be readily unfastened to permit entrance to the back seat of the car, and may be readily secured in position after the occupants are within the car.

Operation

In the operation of the structures, the driver's belt and the rear belts may be secured in position as above described and the car started and operated in the usual manner. In the event of a collision or an emergency where the car has to be strongly decelerated, the pressure cartridges 22 and 24 are operated to release gas pressure to the inflatable members 21 and 23, and the cushions are instantly formed, as shown in Fig. 1. The cushion 21 forms a protective barrier between the driver and the steering wheel, while the cushion 23 forms a barrier between the other occupant of the front seat and the dashboard 12 and windshield 10.

In the back seat, the occupant or occupants who are thrown forward engage the inflated structure 25, and the straps 29 cooperate with the inflated structure 25 to direct the occupants toward the central part of the car and thus away from the doors, which are usually thrown open under the force of a collision, etc. Thus, while straps unequipped with cushions might have proved injurious to the occupants of the rear seat, it is found that the straps in the present combination do not even strike the occupants but instead direct them toward the cushioned or inflated member 25 and maintain the occupants of the rear seat within the central cushioned area.

While I have shown a pressure cartridge as a means for releasing cushioning gas to the various inflatable members, it will be understood that gas may be supplied from other sources, and further, the release of the gas may be not only by automatic inertia-responsive means, but also by means responsive to other conditions of automobile operation.

The combination of straps and inflated cushions is particularly advantageous when used with children as occupants of the rear seat, etc. Ordinarily, children are unwilling to wear belts for any length of time, and the present structure permits them to play and move about the rear seat while at the same time offering them high protection in the event of a collision. As already stated, the individuals are confined against the cushioning structure 25 by the action of the belts, and the inflated member further serves as an obstacle, preventing the occupants from being thrown over the seats and against the windshield.

The large size of the inflated pads enables a relatively low pressure to be maintained while at the same time providing effective protection. If desired, the inflated pad 23 on the cowl in front of the front seat passenger may be permanently inflated with air and effective protection can be given even if the inflation is only to about three to five pounds of pressure.

It will be understood that while the cartridge employed may be actuated by a pendulum or other device, any other suitable control means may be used. For example, a mercury filled bowl having a perimeter contact may be employed for controlling the valve to inflate the bags, this type of control being effective in case of sudden sidewise motion as well as where there is a rear-end collision, while at the same time providing the control for forward deceleration.

While in Figs. 2 and 5, I have shown the belts 29 secured to the rear car frame and extending forwardly to hold the inflated pad 25, it will be understood that straps or chains or cables may be employed for securing the front seat itself from going forward, while at the same time the front seat holds the inflated pad. In other words, the chain or cable holding the front seat may act as a flexible joint in connection with door hinges, and when the doors are closed, the cable or chain can lead down at a forty-five degree angle, terminating in a fastener in the frame. This will supply an automatic fastening without use of strap buckles, and it will be stronger than straps, while at all times preventing the front seats from breaking loose.

While, in the foregoing specification, I have set forth a specific structure in considerable detail for the purpose of illustration, it will be understood that such details of structure may be varied widely by those skilled in the art without departing from the spirit of my invention.

I claim:

1. In combination with a car having longitudinally-spaced seats, an inflated cushion supported upon said car forward of one of said seats and spaced from a passenger sitting thereon, straps secured to the lower portion of said car and engaging the ends of said cushion to provide diagonal guides extending between the car and the cushion to prevent passengers from being thrown laterally from the seats in the event of a collision, and means for supporting said cushion at an elevated position aligned with the tops of the seats.

2. The structure of claim 1, in which said cushion is secured to the top rear portion of the front seat.

3. The structure of claim 1, in which said cushion is in the form of an elongated cylinder.

4. In combination with a car equipped with front and rear seats, an elongated cushion extending along the top rear side of the front seat, means for securing said cushion upon said seat, and guide straps secured to said cushion adjacent the ends thereof and extending downwardly and secured to a lower rear car portion, whereby said straps form diagonal barriers extending across the ends of the seat space to prevent passengers from being thrown laterally from the car in the event of a collision or sudden stoppage of the car.

5. In combination with a vehicle equipped with seats and with a dashboard and a windshield thereabove, an inflatable cushion disposed at a spaced distance forward of one of said seats and at substantially the same elevation as the top of said seats, said cushion being equipped with straps which extend downwardly and are anchored to the lower portion of the car to provide diagonal guides encompassing the sides of said one seat for supporting an occupant against lateral movement during sudden deceleration of the car, and gas supply means connected with said cushion and adapted to inflate the same upon sudden deceleration of the car.

6. The structure of claim 5 in which said cushion is transparent.

7. The structure of claim 5 in which said cushion is cylindrical when inflated.

8. In combination with a car having a seat therein, an inflatable cushion mounted upon said car and spaced forward of said seat, said cushion being disposed higher than the horizontal supporting surface of said seat and being equipped with straps which extend downwardly and are anchored to the lower portion of the car to provide diagonal guides encompassing the sides of said seat to prevent a passenger from being thrown laterally from the seat in the event of a collision, and gas supply means connected with said inflatable cushion and adapted to inflate the same upon sudden deceleration of the car.

9. The structure of claim 8 in which said cushion is transparent.

10. The structure of claim 8 in which said cushion is in the form of an elongated cylinder.

References Cited in the file of this patent

UNITED STATES PATENTS

| | | |
|---|---|---|
| 2,560,009 | Straith | July 10, 1951 |
| 2,649,311 | Hetrick | Aug. 18, 1953 |
| 2,661,221 | Lockwood | Dec. 1, 1953 |
| 2,755,125 | Hodges | July 17, 1956 |
| 2,757,040 | McLelland | July 31, 1956 |

FOREIGN PATENTS

| | | |
|---|---|---|
| 769,903 | France | June 18, 1934 |
| 1,008,155 | France | Feb. 13, 1952 |
| 1,068,761 | France | Feb. 10, 1954 |
| 896,312 | Germany | Nov. 12, 1953 |
| 897,053 | Germany | Nov. 16, 1953 |
| 311,944 | Italy | Oct. 16, 1933 |